(12) United States Patent
Castrogiovanni et al.

(10) Patent No.: US 8,396,469 B2
(45) Date of Patent: Mar. 12, 2013

(54) ASSOCIATION OF A MOBILE USER IDENTIFIER AND A RADIO IDENTIFIER OF A MOBILE PHONE

(75) Inventors: Pino Castrogiovanni, Turin (IT); Giovanni Martini, Turin (IT)

(73) Assignee: Telecom Italia S.p.A., Milan (IT)

( * ) Notice: Subject to any disclaimer, the term of this patent is extended or adjusted under 35 U.S.C. 154(b) by 272 days.

(21) Appl. No.: 12/451,751

(22) PCT Filed: May 31, 2007

(86) PCT No.: PCT/EP2007/055359
§ 371 (c)(1),
(2), (4) Date: Apr. 9, 2010

(87) PCT Pub. No.: WO2008/145192
PCT Pub. Date: Dec. 4, 2008

(65) Prior Publication Data
US 2010/0190491 A1    Jul. 29, 2010

(51) Int. Cl.
*H04W 4/00* (2009.01)
(52) U.S. Cl. .......... 455/426.1; 455/466; 370/331
(58) Field of Classification Search .......... 455/426.1, 455/466
See application file for complete search history.

(56) References Cited

U.S. PATENT DOCUMENTS

| | | |
|---|---|---|
| 6,766,160 B1 | 7/2004 | Lemiläinen et al. |
| 2004/0005886 A1 | 1/2004 | Oda et al. |
| 2004/0203963 A1 * | 10/2004 | Shivaram et al. ............ 455/466 |
| 2005/0059398 A1 | 3/2005 | Jaupitre et al. |
| 2005/0076124 A1 | 4/2005 | Enderlein et al. |
| 2005/0097356 A1 | 5/2005 | Zilliacus et al. |

FOREIGN PATENT DOCUMENTS

| | | |
|---|---|---|
| EP | 1 528 834 A2 | 5/2005 |
| GB | 2 416 648 A | 2/2006 |

OTHER PUBLICATIONS

International Search Report from the European Patent Office for International Application No. PCT/EP2007/055359 (Feb. 22, 2008).

* cited by examiner

*Primary Examiner* — Charles Shedrick
(74) *Attorney, Agent, or Firm* — Finnegan, Henderson, Farabow, Garrett & Dunner, L.L.P.

(57) ABSTRACT

A method of associating a mobile user identifier identifying a mobile interface of a mobile phone and a radio identifier identifying a radio interface of the mobile phone includes: at a device configured to communicate with the radio interface, detecting that the mobile phone is located within a coverage area of the device, thus recovering the radio identifier; establishing a radio connection between device and mobile phone; transmitting to the mobile phone through the radio connection a command to access a mobile service for transmitting to an association server a message including the radio identifier; at the mobile phone, transmitting the message to the association server through the mobile service; and at the association server, retrieving the mobile user identifier through the mobile service and reading the radio identifier from the message, thereby associating the mobile user identifier and the radio identifier.

24 Claims, 6 Drawing Sheets

ASSOCIATION OF A MOBILE USER IDENTIFIER AND A RADIO IDENTIFIER OF A MOBILE PHONE

CROSS REFERENCE TO RELATED APPLICATION

This application is a national phase application based on PCT/EP2007/055359, filed May 31, 2007.

TECHNICAL FIELD

The present invention relates to the field of mobile telephone services. More particularly, the present invention relates to a method and a telecommunication system for associating a mobile user identifier and a radio identifier of a mobile phone.

BACKGROUND ART

As it is known, a mobile telephone network provides mobile services (calls, conference calls, text message delivery, images delivery, IP data connections, etc.) to users provided with mobile phones, i.e. phones having a mobile interface. Examples of mobile telephone networks are the Global System for Mobile Communication (briefly, GSM) and the Universal Mobile Telecommunication System (briefly, UMTS).

Typically, a mobile interface of a mobile phone may be associated to an identifier (which is termed "mobile user identifier"), i.e. to a code univocally identifying the user making use of that mobile phone. For instance, in case of GSM, the mobile user identifier may be either the International Mobile Subscriber Identity (briefly, IMSI) of the user, or the Mobile Subscriber ISDN Number (briefly, MSISDN) of the user. The mobile user identifier is typically stored in a detachable memory device, which is detachably coupled to the mobile phone. For instance, in case of mobile phones of the GSM type, such a detachable memory device is termed Subscriber Identity Module (briefly, SIM card). Typically, the detachable memory device allows to retrieve other information concerning the user's profile, such as: a list of mobile telephone services subscribed by the user, the available credit, the type of contract, at least a part of the user's contacts, etc. This advantageously allows to user, inter alia, to replace his mobile phone with a new mobile phone while preserving its profile, by simply extracting the detachable memory device from the mobile phone and inserting it in the new one.

Nowadays, mobile phones often include, in addition to the above mentioned mobile interface, a radio interface based on a radio technology which is different from the mobile technology upon which the mobile interface is based. Such a radio interface allows a mobile phone to communicate with other devices (such as other mobile phones, computers, laptop, PDAs, residential gateways, etc.) provided with radio interfaces based on the same radio technology. Examples of these radio interfaces are the known Bluetooth interfaces and the known Wi-Fi interfaces.

Differently from mobile communications, the Bluetooth and Wi-Fi communications do not include signal repetition mechanisms. Accordingly, the maximum distance between devices wishing to communicate through their Bluetooth or Wi-Fi interfaces ranges from few meters up to about one hundred meters, according to the signal power level. Further, differently from mobile communications, the Bluetooth and Wi-Fi communication typically uses unlicensed bandwidths, i.e. bandwidths which can be freely used. In particular, in case of Bluetooth interfaces, such unlicensed bandwidth is located at 2.45 GHz. In the following description and in the claims, the expression "radio technology different from the mobile technology" will therefore indicate a radio technology allowing short-range communications and/or not making use of any signal repetition mechanism.

Similarly to the mobile interface which is identified by a mobile user identifier, also a radio interface is univocally identified by a radio identifier. In case of Bluetooth interfaces, such a radio identifier corresponds to a MAC address. In the following description and in the claims, the expression "radio identifier" will indicate an identifier identifying, in a mobile phone comprising both a mobile interface and a radio interface based on a radio technology different from the mobile technology upon which the mobile interface is based, the radio interface.

Typically, there is no association between a mobile user identifier of a mobile phone and the radio identifier(s) (such as the Bluetooth identifier) of such a mobile phone. In other words, a mobile service provider typically ignores the radio identifier(s) of its users' mobile phones, since the radio interfaces of mobile phones are not involved in mobile services. On the other hand, a device communicating with a radio interface of a mobile phone typically ignores the mobile user identifier of that mobile phone, since such a radio communication does not require any interaction with the mobile interface. Therefore, a mobile phone including both a mobile interface and a radio interface generally has two independent identities: a "mobile" identity which is known by the mobile telephone network and a "radio" identity which may be known by other devices having a radio interface based on the same radio technology.

In the art, methods are known allowing to associate the mobile user identifier and the radio identifier of a given mobile phone including both a mobile interface and a radio interface. These methods advantageously allow a mobile service provider to provide its users with additional mobile services which exploit not only resources of the mobile telephone network but also devices provided with radio interfaces capable of communicating with the mobile phones of its users. Examples of these additional mobile services will be described in detail herein after.

In the following description, reference will be made to a situation wherein one mobile user identifier is associated to one mobile phone at a time, and therefore to one radio identifier. However, the following description applies also to a situation wherein one mobile user identifier is associated to more than one (typically two) mobile phones. For instance, a user of a GSM network may be provided with a pair of "twin" SIM cards, i.e. two SIM cards storing the same mobile user identifier, the same profile, and so on. The two (or more) SIM cards may be coupled to different mobile phones. If each mobile phone has its own radio interface, each radio interface being identified by a different radio identifier, then the mobile user identifier will be associated to all these radio identifiers.

US application 20050076124 discloses a method for anonymous identification of the profiles of subscribers in a communication system. Each module of a subscriber is allocated an ID number. The so-called Bluetooth device address, which is supported by the Bluetooth Standard, is automatically used as the ID number, and uniquely identifies every Bluetooth module throughout the world. Once the systems have first been switched on, the modules transmit their ID numbers via the cellular communication appliances to the intermediate provider. The provider then sets up a unique association between the ID number of the module and the address (telephone number) of the cellular communication appliance.

U.S. Pat. No. 6,766,160 discloses an apparatus, and an associated method, facilitating authentication of at least a portion of a Bluetooth-based, or other, communication system by a mobile terminal. When the mobile terminal is to be operated pursuant to the Bluetooth communication system, the identifier stored at the storage device is retrieved and thereafter used during authentication procedures by which the mobile terminal authenticates the personal base unit of the Bluetooth communication system. In an implementation in which the cellular communication system forms a GSM communication system which provides for SMS (Short Message Service) messaging, the indicator, such as the PIN code, is formatted into a SMS message and the SMS message is sent to the network infrastructure of the cellular communication system, routed to a SMS service centre.

SUMMARY OF THE INVENTION

The Applicant has noticed that the above solutions described by US application 20050076124 and U.S. Pat. No. 6,766,160 have some drawbacks.

Regarding to the solution described by US application 20050076124, the Applicant has noticed that the modules transmit their ID numbers via the cellular communication appliances to the intermediate provider only if they are provided with a particular application configured to enable the module (i.e. the mobile phone) to detect its mobile user identifier and its radio identifier, and to transmit them to the service provider. This disadvantageously requires that the provider delivers this particular application to the mobile phone and that the user installs it on the mobile phone, before activating the above mentioned additional mobile services.

Regarding to the solution described by U.S. Pat. No. 6,766,160, the Applicant has noticed that also this solution disadvantageously requires to provide the mobile phone with a particular application configured for sending an SMS comprising both the PIN code and the Bluetooth identifier of the mobile phone. Therefore, also this solution disadvantageously requires that the provider delivers this particular application to the mobile phone and that the user installs it on the mobile phone, before activating the above mentioned additional mobile services.

Accordingly, the Applicant has faced the problem of providing a method and system for associating a mobile user identifier identifying a mobile interface of a mobile phone and a radio identifier identifying a radio interface of the mobile phone, the mobile interface being based on a mobile technology and the radio interface being based on a radio technology different from the mobile technology, which overcome the aforesaid drawbacks, i.e. which may be performed without delivering and installing any particular application on the mobile phone.

According to a first aspect, the present invention provides a method of associating a mobile user identifier identifying a mobile interface of a mobile phone and a radio identifier identifying a radio interface of the mobile phone, the mobile interface being based on a mobile technology and the radio interface being based on a radio technology different from the mobile technology. The method comprises:

a) at a device configured to communicate with the radio interface, detecting that the mobile phone is located within a coverage area of the device, thus recovering the radio identifier;

b) establishing a radio connection based on the radio technology between the device and the mobile phone;

c) transmitting to the mobile phone through the radio connection a command to access a mobile service for transmitting to an association server a message comprising the radio identifier;

d) at the mobile phone, transmitting the message to the association server through the mobile service; and e) at the association server, retrieving the mobile user identifier through the mobile service and reading the radio identifier from the message, thereby associating the mobile user identifier and the radio identifier.

Preferably, step a) is periodically repeated every T1 seconds. Preferably, step a) comprises performing a Bluetooth device discovery and step b) comprises establishing a Bluetooth connection between the device and the mobile phone.

According to preferred embodiments, steps b), c) and d) are periodically performed every T2 seconds.

According to preferred embodiments, step c) comprises transmitting to the mobile phone through the radio connection a command to access a short message service or a general packet radio service.

Preferably, step d) further comprises transmitting from the mobile phone to the association server a counter which is increased by one at the device each time the command is transmitted to the mobile phone.

Profitably, step d) further comprises, at the mobile phone, encrypting the message by using a password.

Preferably, step d) further comprises transmitting from the mobile phone to the association server a security key allowing authentication of the message.

According to preferred embodiments, step c) further comprises, after transmitting, storing at the device a transmission time Ts wherein the command has been transmitted to the mobile phone and an information indicative of an outcome of the transmitting.

Profitably, step e) further comprises, before reading, authenticating the message.

Preferably, step e) further comprises, after retrieving and reading, storing an association between the mobile user identifier and the radio identifier in an association record of an association table.

Profitably, step e) further comprises, after retrieving and reading, retrieving from the mobile network further information relating to a user of the mobile phone and to the mobile phone.

According to preferred embodiments, step e) comprises deleting an association for which more than T3 seconds have passed since a further message relating to the association has been received at the association server.

According to a second aspect, the present invention provides a telecommunication system for associating a mobile user identifier identifying a mobile interface of a mobile phone and a radio identifier identifying a radio interface of the mobile phone. The telecommunication system comprises: a mobile phone provided with the mobile interface and the radio interface, the mobile interface being based on a mobile technology and the radio interface being based on a radio technology different from the mobile technology; a device having a further radio interface based on the radio technology; and an association server. In the telecommunication system of the present invention:

i) the device is configured to detect that the mobile phone is located within a coverage area of the device, thus recovering the radio identifier; to establish a radio connection based on the radio technology with the mobile phone; and to transmit to the mobile phone through the radio connection a command to access a mobile service for transmitting to an association server a message comprising the radio identifier;

ii) the mobile phone is configured to transmit the message to the association server through said mobile service; and iii) the association server is configured to retrieve the mobile user identifier through the mobile service and to read the radio identifier from the message, thereby associating the mobile user identifier and the radio identifier.

BRIEF DESCRIPTION OF THE DRAWINGS

The present invention will become more clear by reading the following detailed description, given by way of example and not of limitation, to be read with reference to the accompanying drawings, wherein.

DETAILED DESCRIPTION OF PREFERRED EMBODIMENTS OF THE INVENTION

Figure 1:
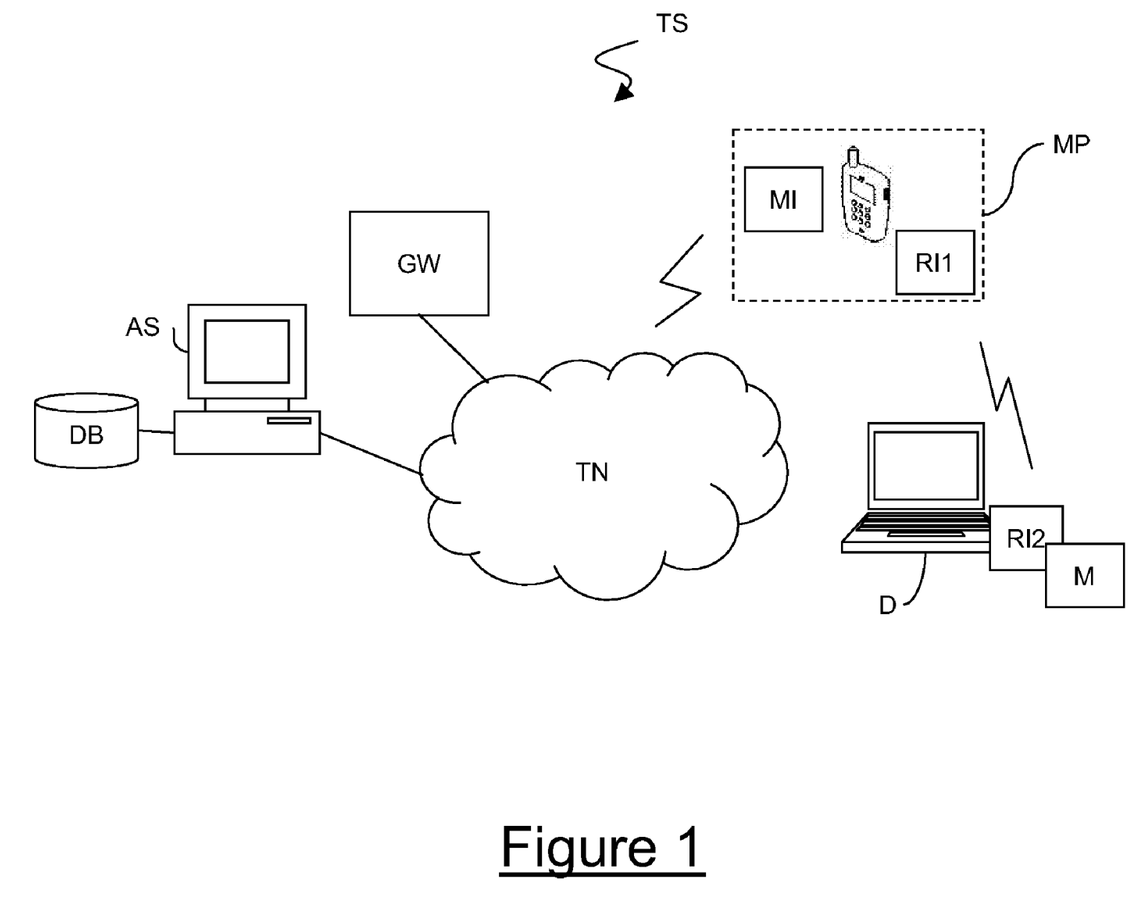
FIG. 1 schematically shows a telecommunication system configured to implement the method according to an embodiment of the present invention.

FIG. 1 schematically shows a telecommunication system TS configured to implement the method according to an embodiment of the present invention The telecommunication system TS comprises a mobile telephone network TN and a mobile phone MP which is used by a given user. Optionally, the mobile telephone network TN may comprise several sub-networks that are managed by different operators.

The mobile phone MP comprises a mobile interface MI which is capable of communicating with the mobile telephone network TN, and which is identified by a user identifier MUid. Further, the mobile phone MP comprises a radio interface RI1, e.g. a Bluetooth interface. The radio interface RI1 preferably stores information relating to the radio interface profile of RI1, such as a radio identifier RIid (e.g. the Bluetooth MAC address) and, optionally, a password for authorizing the establishment of a radio connection between the radio interface RI1 of the mobile phone MP and a further radio interface, as it will be described in detail herein after.

The telecommunication system TS further comprises a device D, which includes a further radio interface RI2. The further radio interface RI2 of the device D is capable of communicating with the radio interface RI1 of the mobile phone MP. For instance, also the further radio interface RI2 of the device D is a Bluetooth interface. Preferably, also the device D belongs to the user. For instance, the device D may be a desktop PC, a laptop PC, a PDA, a residential gateway, a TV set-top-box, etc. By way of example, the device D shown in FIG. 1 is a laptop PC. Preferably, the further radio interface RI2 has a module M, whose role will be explained in detail herein after by referring to FIG. 2. Preferably, the module M may be installed on the further radio interface RI2 by the manufacturer upon fabrication of the interface, or it can be distributed by the mobile service provider and then installed by the user.

Further, the telecommunication system TS of FIG. 1 comprises a message gateway GW (e.g. a SMS gateway) which cooperates with the mobile telephone network TN and which is configured to manage delivery of messages (e.g. SMS messages) exchanged between users of the mobile telephone network TN. Further, the telecommunication system TS comprises an association server AS and a database DB cooperating with the association server AS, whose role will be described in detail herein after by referring to FIG. 2.

Figure 2:
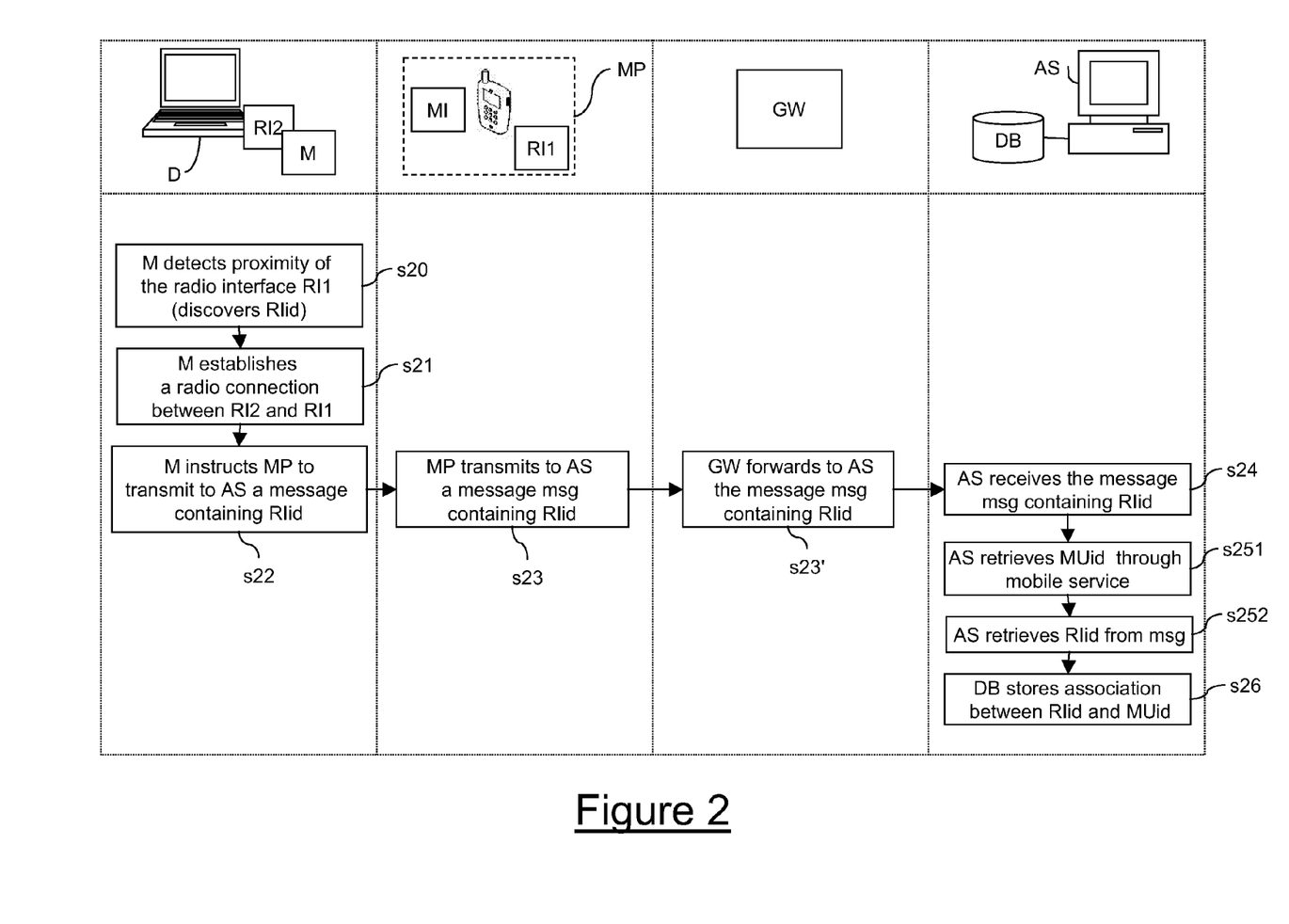
FIG. 2 schematically shows the method as implemented by the telecommunication system of FIG. 1.

By referring to FIG. 2, the operation of the telecommunication system TS of FIG. 1 according to an embodiment of the present invention will be now described. FIG. 2 is in the form of a flow chart. On the top of the flow chart the various devices performing one or more steps are shown for improving clarity.

According to an embodiment of the present invention, the module M included in the further radio interface RI2 of the device D is configured to detect possible radio interfaces located within the coverage area of the further radio interface RI2. In particular, the module M is configured to detect whether the radio interface RI1 of the mobile phone MP is located within the coverage area of RI2. This step is indicated in FIG. 2 with a reference numeral s20. For instance, when both the radio interface RI1 and the further radio interface RI2 are Bluetooth interfaces, this step s20 may be performed as a known "device discovery" process. As the further radio interface RI2 detects the radio interface RI1, it also discovers its radio identifier RIid.

When the module M detects the radio interface RI1, the module M preferably establishes a radio connection between the further radio interface RI2 and the radio interface RI1 (step s21). Preferably, in case RI1 and RI2 are Bluetooth interfaces, the radio connection between the further radio interface RI2 and the radio interface RI1 is established by using the Dial-Up Networking (briefly, DUN) profiles of RI1 and RI2. This mechanism is preferred since mobile phones of the GSM or UMTS type which include a Bluetooth radio interface are generally provided with a DUN profile allowing the radio interface RI1 to instruct the mobile phone MP to transmit SMS messages without requiring the installation of any dedicated application on the mobile phone MP, as it will be described in detail herein after.

During step s21, the module M may ask the radio interface RI1 an authorization to establish the radio connection. In this case, the user may be requested to insert a password both at the mobile phone MP and at the device D.

Upon establishment of the radio connection between the further radio interface RI2 and the radio interface RI1, the module M preferably uses the radio connection for transmitting to the mobile phone MP a command instructing the mobile phone MP to access a mobile service (e.g. SMS, GPRS, etc.) for transmitting to the association server AS a message including the radio identifier RIid (step s22).

In particular, in case the radio connection is established during step s21 by using the DUN profiles of RI1 and RI2 and the mobile phone has a GSM modem, the module M may use the DUN profile for transmitting to the mobile phone MP AT commands which can be received by the GSM modem and which instruct the mobile phone MP to access the SMS service for transmitting to the association server AS an SMS message including the radio identifier RIid.

Alternatively, in case the radio connection is established during step s21 by using the DUN profiles of RI1 and RI2, the module M may use the DUN profile for transmitting to the mobile phone MP AT commands which instruct the mobile phone MP to activate a dial-up data connection (e.g. a GPRS connection) for transmitting to the association server AS a message msg including the radio identifier RIid.

Preferably, the command comprises a predefined number ASn corresponding to the association server AS to which the message has to be transmitted.

Figure 3:
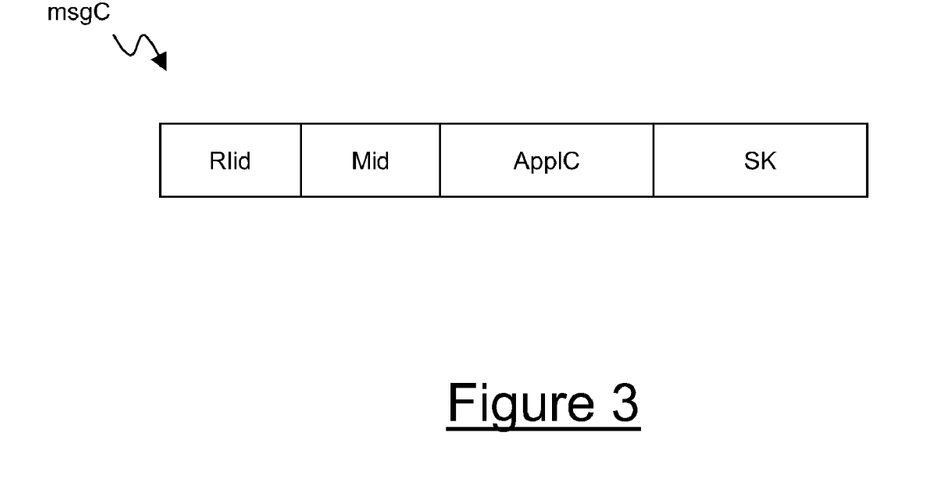
FIG. 3 schematically shows the content of a message sent by mobile phone to association server, according to an embodiment of the present invention.

During two successive steps s23 and s23', the mobile phone MP receives the command from the device D, and then it transmits the message to the association server AS through the message gateway GW. FIG. 3 schematically shows the content msgC of the message msg.

Preferably, besides the radio interface RIid, the message content msgC comprises:
- an identifier Mid of the module M which generated the command;
- a counter AppIC which is increased by one by the module M each time the command is transmitted to the mobile phone MP (as it will be explained in further detail herein after, the command is preferably periodically transmitted to the mobile phone MP, in order to refresh the association in the database DB);
- a security key SK, allowing the association server AS to authenticate the received message msg, as it will be described herein after in further detail by referring to FIG. 6.

Optionally, during step s23, the mobile phone MP may also encrypt the message content msgC by means of a password. Such a password may be either a public key of the association server AS or a private password.

By referring again to FIG. 2, during a successive step s24, the association server AS receives the message msg from the mobile phone MP.

Then, during a successive step s251, the association server AS retrieves the mobile user identifier MUid through the mobile service by which the mobile phone MP has transmitted the message msg. For instance, if the mobile service is the SMS service, the association server AS preferably retrieves the mobile user identifier MUid from sender information (in particular, the MSISDN) provided by the SMS service itself. Alternatively, if the mobile service is the GPRS service, the association server AS uses the network address of the mobile phone (e.g. an IP address) to retrieve the mobile user identifier MUid from the mobile telephone network TN.

Then, during a successive step s252, the association server AS reads the radio identifier RIid from the content msgC of the received message msg. In this way, the association server AS creates an association between the mobile user identifier MUid and the radio identifier RIid of the mobile phone MP. Step 252 also comprises, if the mobile phone MP has encrypted the message content msgC during step s23, decrypting the message content msgC before reading it.

During a successive step s26, such an association is stored in the database DB cooperating with the association server AS. The association may be stored under different forms. For instance, the association may be stored as an XML (Extensible Markup Language) file, as a text file, or as an association record of an association table.

Figure 4:
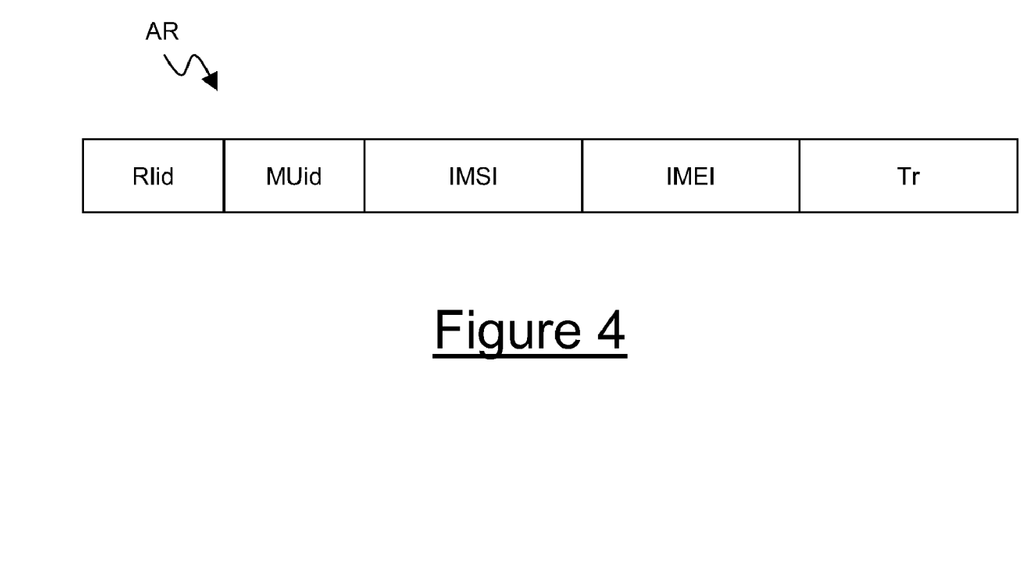
FIG. 4 schematically shows an association record stored in a database cooperating with the association server, according to an embodiment of the present invention.

By way of example, FIG. 4 shows an association record AR configured to store the association between the mobile user identifier MUid and the radio identifier RIid in the database DB. Preferably, the association record AR comprises a first field comprising the radio identifier RIid and a second field comprising the mobile user identifier MUid. Both the first and the second fields of the association record AR may be used as a search key for searching the association record AR in the database DB. Preferably, the association record AR may comprise further fields, each further field comprising a further information concerning either the mobile phone MP or the user.

For instance, if the mobile user identifier MUid is the MSISDN of the user, a third field of the association record AR may comprise the IMSI code of the user, provided that the service provider makes it available to the association server AS. Further, a fourth field may comprise an identifier of the mobile phone MP, such as the International Mobile Equipment Identity (briefly, IMEI). Finally, a fifth field of the association record AR may comprise a reception time Tr, indicating the time at which the message msg shown in FIG. 3 has been received at the association server AS. This latter field may be used by the association server for deleting "old" associations from the database DB, as it will be explained in further detail by referring to FIG. 6.

Therefore, advantageously, the method according to this embodiment of the present invention advantageously allows to associate the mobile user identifier and the radio identifier of a mobile phone including both a mobile interface and a radio interface without requiring installation of any dedicated application on the mobile phone.

Indeed, advantageously, the association is performed on the initiative of the device D (in particular of the module M), which firstly detects the presence of the mobile phone MP (i.e. of the radio interface RI1) in its coverage area, then establishes a radio connection with the mobile phone MP, and finally uses the established radio connection for instructing to the mobile phone to transmit the radio identifier of the mobile phone MP to the association server AS through a mobile service supported by the telephone mobile network (e.g. SMS, GPRS, etc.). Since the radio identifier RIid is received by the association server AS in form of a message msg, the association server AS can read the mobile user identifier in the message msg. Therefore, the only operation that the mobile phone MP has to perform is authorizing establishment of the radio connection with the device D and transmitting the message msg to the association server AS through a mobile service. These operations may be performed by any mobile phone provided with a radio interface, without requiring installation of any dedicated application.

Further, advantageously, the method according to this embodiment of the present invention requires fewer interventions by the user in comparison to the known techniques. Indeed, all the various steps are automatically performed either by the device D or by the mobile phone MP except when, during step s21, the device D asks to the mobile phone MP an authorization to establish the radio connection. As already mentioned, in this case the user is asked to insert a password at the mobile phone MP for authorizing the radio connection establishment. Therefore, the method of the invention is particularly convenient for the user, since it is almost performed automatically by the device D and the mobile phone MP, substantially transparently to the user.

Figure 5:
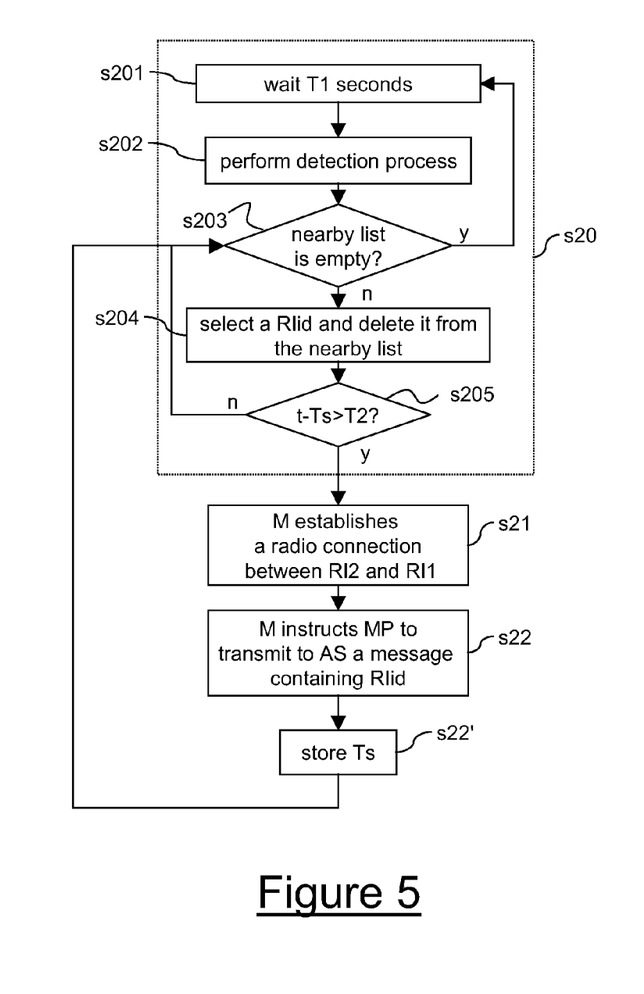
FIG. 5 shows in further detail the steps shown in FIG. 2 which are performed by the device including a radio interface.

FIG. 5 shows in further detail the steps s20, s21 and s22 which are performed by the device D (in particular, by the module M) according to an embodiment of the present invention.

As already described by referring to FIG. 2, during step s20 the module M detects whether the radio interface RI1 of the mobile phone MP is located within the coverage area of RI2. Preferably, such a step s20 is periodically repeated, for instance every T1 seconds, wherein T1 can be equal to 5 seconds, for instance. This advantageously allows to update substantially in real time the information about the proximity of the mobile phone MP to the device D, thus allowing to provide mobile services exploiting such an information, as it will be described in further detail herein after by referring to FIG. 7.

For performing step s20 every T1 seconds, during a first sub-step s201 the module M firstly checks whether T1 seconds have passed since the last detection (e.g. the device discovery, in case of Bluetooth interfaces) has been performed. When T1 seconds have passed, the further radio interface RI2 then starts a new detection process (sub-step s202). Preferably, during sub-step s202 the further radio interface RI2 temporarily stores the radio identifiers of possible detected radio interfaces (such as the radio interface RI1) in a nearby list.

Then, during a successive sub-step s203, the module M checks whether the nearby list is empty. In the affirmative, the module M does not have to perform any other steps, and therefore it goes back to sub-step s201, where it waits other T1 seconds before repeating the detection process. In the negative (i.e. the nearby list is not empty), the module M selects one by one all the radio identifiers comprised in the nearby list.

For each selected radio identifier RIid, the module M preferably performs the following sub-steps. First of all, the module M deletes the selected radio identifier RIid from the nearby list (sub-step s204). Then, the module M estimates the time elapsed since the last command relating to the selected radio identifier RIid has been transmitted to the mobile phone MP (sub-step s205). This elapsed time is equal to t-Ts, where t is the current time, while Ts is the time wherein the last command relating to the selected radio identifier RIid has been transmitted to the mobile phone MP Then, the module M checks whether t-Ts is higher than T2 seconds. For instance, T2 may be equal to 86400 seconds, i.e. 24 hours. If less than T2 seconds have passed since the last command relating to the selected radio identifier RIid has been transmitted to the mobile phone MP, the module M passes to the next radio identifier comprised in the nearby list. On the contrary, if more than T2 seconds have passed since the last command relating to the selected radio identifier RIid has been transmitted to the mobile phone MP, the module M performs the above described step s21 of establishing a radio connection (preferably, by using the DUN profile, in case of Bluetooth interfaces) with the radio interface identified by the radio identifier RIid. Finally, the module M performs the above described step s22 of transmitting to the mobile phone MP a command instructing the mobile phone MP to access a mobile service (e.g SMS, GPRS, etc.) for transmitting a message including the radio identifier RIid to the association server AS.

In other words, by performing the check of sub-step s205, the device D refreshes the associations stored in the database DB every T2 seconds.

Finally, preferably, the module M performs a subsequent step s22' of storing a transmission time Ts wherein the command relating to the radio identifier RIid has been sent to the mobile phone MP. This allows the module M to estimate the successive time wherein refresh of the association has to be performed. Preferably, during step s22' the module M also associates to the transmission time Ts an information indicative of the outcome of the command transmission operation. Indeed, the command transmission may either be successful or it may fail. Failure of the command transmission may occur for instance if the mobile phone MP does not authorize establishment of the radio connection with the further radio interface RI2. Alternatively, failure of the command transmission may occur if the mobile phone MP does not support the requested radio connection.

Then, the module M performs again the sub-step s203, wherein it checks whether the nearby list is empty. When the nearby list is empty, the module M realizes that refresh of the association between mobile user identifier and radio identifier has already been performed in due time for all the detected mobile phones, and no new mobile phone has been detected in the coverage area of the second radio interface RI2.

Figure 6:
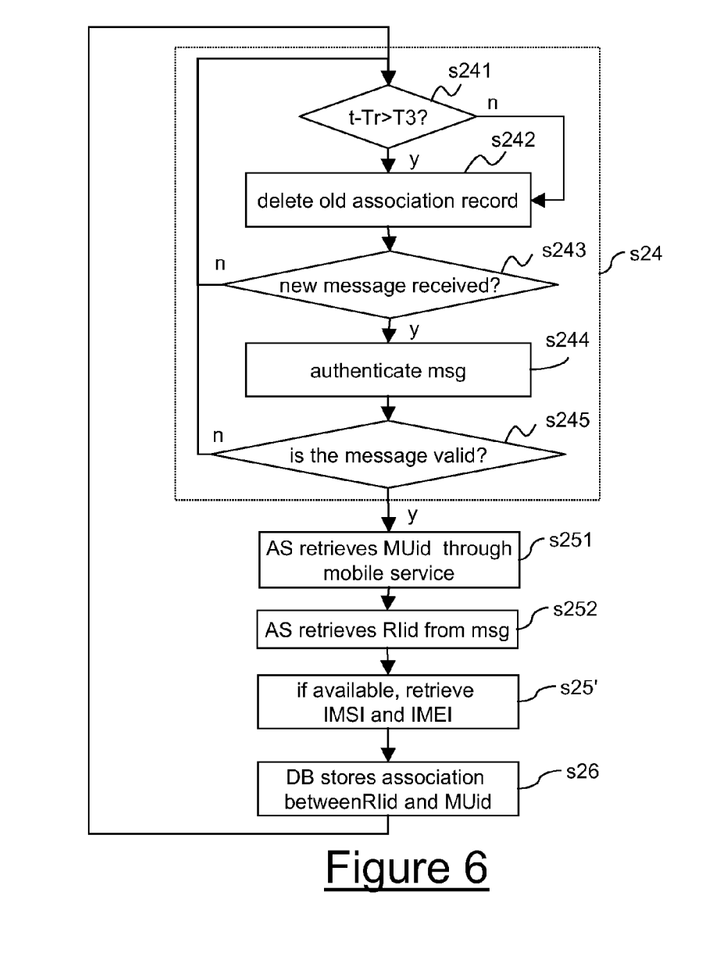
FIG. 6 shows in further detail the steps shown in FIG. 2 which are performed by the association server.

FIG. 6 shows in further detail the steps s24, s25 and s26 performed by the association server AS according to an embodiment of the present invention.

As already explained by referring to FIG. 2, during step s24 the association server AS receives the message msg transmitted by the mobile phone MP through a mobile service (e.g. SMS, GPRS, etc.). More particularly, preferably, while the association server AS is listening for possible messages from the mobile phones connected to the mobile telephone network TN, it may delete from the database DB "old" associations, i.e. associations for which more than T3 seconds have passed since the last message concerning the association has been received at the association server AS. T3 may be equal for instance to 86400×30 seconds, i.e. 30 days. In other words, if an association is not refreshed for T3 seconds, it is considered "old" and therefore it is deleted from the database DB.

For deleting "old" associations, the association server AS retrieves from the database DB all the association records and, for each retrieved association record, it checks whether the difference between a time Tr wherein the last message concerning this association has been received at the association server AS and the current time t is higher than T3 (sub-step s241). In the negative, the association is not considered "old", and therefore the association server AS does not delete it from the database DB, and it passes considering the next association record. On the contrary, if more than T3 seconds have passed since the last message concerning the association has been received, the association record is deleted from the database DB (sub-step s242).

In the meanwhile the association server AS is listening for possible messages (sub-step s243). When the message msg is received, the association server AS preferably authenticates the message msg (sub-step s244), i.e. it uses the security key SK comprised in the message msg for verifying the identity Mid of the module M which originated the command to transmit the message msg.

If the received message msg is not valid (since the association server AS does not recognizes the identity Mid of the module M), the association server AS ignores the received message msg, and it goes on with sub-steps s241 and 242 of deleting "old" associations from the database DB and with sub-step s243 of listening for possible new messages.

On the contrary, if the message msg is valid, the association server AS preferably performs the above described step s251, wherein it retrieves the mobile user identifier MUid through the mobile service by which the mobile phone MP has transmitted the message msg, and the above described step 252, wherein it reads the radio identifier RIid from the content msgC of the received message msg. Preferably, after steps s251 and 252, the association server AS may perform a further step s25' wherein it retrieves from the mobile telephone network TN other information relating to the user and mobile phone identified by the mobile user identity MUid. For instance, by assuming that the mobile user identifier MUid retrieved during step 251 is the users MSISDN, during step s25' the association server AS may retrieve the IMSI code of the user and the IMEI code of its mobile phone.

Finally, the association server AS performs the step s26 described above by referring to FIG. 2.

As already mentioned in the introduction, associating the mobile user identifier and the radio identifier of a mobile phone including a mobile interface and a radio interface advantageously allows a mobile service provider to provide its users with additional mobile services exploiting not only resources of the mobile telephone network, but also devices provided with a radio interface.

Figure 7:
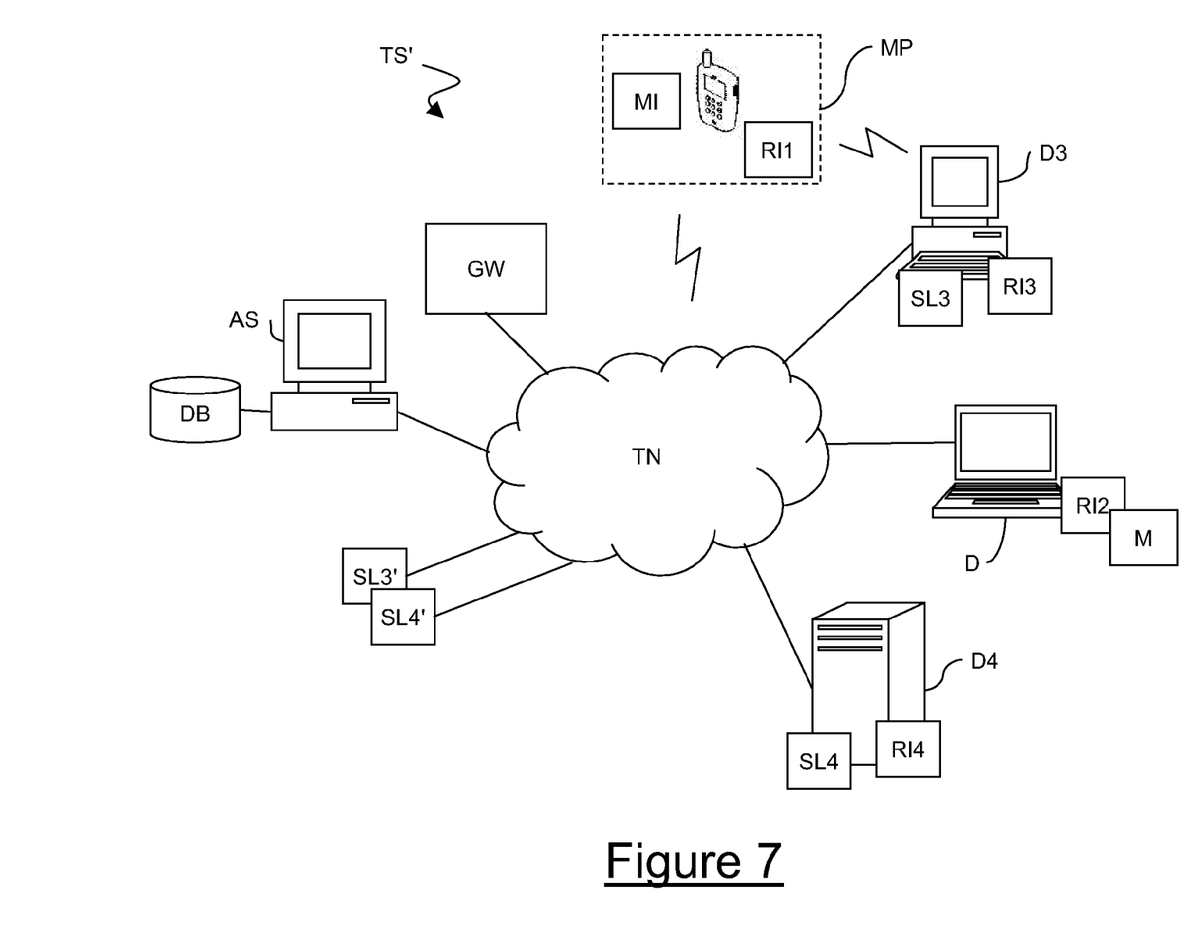
FIG. 7 schematically shows an illustrative telecommunication system capable of providing an additional mobile service by exploiting the association between mobile user identifier and radio interface identifier.

FIG. 7 schematically shows a telecommunication system TS' of the type shown in FIG. 1, which is capable of supporting at least one additional mobile service by using the association between mobile user identifier and radio identifier.

Similarly to the telecommunication system TS of FIG. 1, the telecommunication system TS' comprises a mobile telephone network TN and a mobile phone MP of a given user. The mobile phone MP has a mobile interface MI for communicating with the mobile telephone network TN. Preferably, the mobile interface is identified by a mobile user identifier MUid. Further, the mobile phone MP comprises a radio interface (e.g. a Bluetooth interface) based on a radio technology different from the mobile technology. The radio interface RI1 is identified by a radio identifier RIid. Furthermore, the telecommunication system TS' comprises a device D provided with a further radio interface RI2 (e.g. a Bluetooth interface) which is capable of communicating with the radio interface RI1 of the mobile phone MP. By way of example, the device D is the user's laptop. The further radio interface RI2 is based on the same radio technology as the radio interface RI1 of the mobile phone MP, and it is provided with a module M. Further, the telecommunication system TS' comprises a message gateway GW (e.g. an SMS gateway) cooperating with the mobile telephone network TN, an association server AS and a database DB cooperating with the association server AS.

The database DB stores an association record similar to the association record AR shown in FIG. 4, which comprises the mobile user identifier MUid and the radio identifier RIid. The various steps allowing to generate and store the association record have already been described above by referring to FIGS. 2, 5 and 6. Therefore, a detailed description will not be repeated.

In addition to the above mentioned components, the telecommunication system TS' comprises a first service device D3 including a first service radio interface RI3 and a second service device D4 including a second service radio interface RI4. Both the first service radio interface RI3 and the second service radio interface RI4 are capable of communicating with the radio interface RI1 of the mobile phone MP (i.e. they are based on the same radio technology, e.g. Bluetooth).

Further, the first service device D3 and the second service device D4 comprise respective service logic components SL3 and SL4, while the telecommunication system TS' comprises further service logic components SL3' and SL4' connected to the mobile telephone network TN. The service logic components SL3 and SL4 are connected to the service logic components SL3' and SL4' (e.g. by means of a wired connection such as an ADSL connection), and they are configured to cooperate with the service logic components SL3' and SL4', respectively, for providing the mobile phone MP with a first and a second additional mobile service, respectively.

By way of example, it is assumed that the first service device D3 is a desktop PC located at the user's office. Further, it is assumed that the second service device D4 is a server which is placed in a public place, such as a museum room, a railway station, etc.

Under such assumptions, the first additional mobile service provided by the service logic components SL3 and SL3' may be the following. When the mobile phone MP is located nearby the first service device D3 (namely, when the user with his mobile phone MP is in his office nearby his desktop PC) and it receives a call, the call may be forwarded (either automatically or under request from the user) to the first service device D3, provided that the first service device D3 has suitable audio reception-transmission means (such as a VoIP software client).

Further, under such assumptions, the second additional mobile service provided by the service logic components SL4 and SL4' may be the following. When the mobile phone MP is located nearby the second service device D4 (namely, when the user with his mobile phone MP is in the museum room, at the railway station, etc.), the mobile telephone network TN may send to the mobile phone MP audio or text messages (e.g. SMS messages) carrying information which can be useful to the user. For instance, if the second service device D4 is placed in a museum room, the message may comprise a commentary to the works exhibited in that room. On the other hand, if the second service device D4 is placed in a railway station, the message may comprise tourist information.

The implementation of both the first and the second additional mobile services above requires that the service components (i.e. SL3, SL3' for the first service, and SL4, SL4' for the second service) may access the association between the mobile user identifier MUid and the radio interface identifier RIid.

Indeed, in the first service the radio identifier RIid is needed to detect proximity of the mobile phone MP to the first service device D3, while the mobile use identifier MUid is needed to recognise calls directed to the mobile phone MP. On the other hand, in the second service the radio identifier RIid is needed to detect proximity of the mobile phone MP to the second service device D4, while the mobile user identifier MUid is needed to send the message(s) with the information which can be useful to the user.

Figure 8:
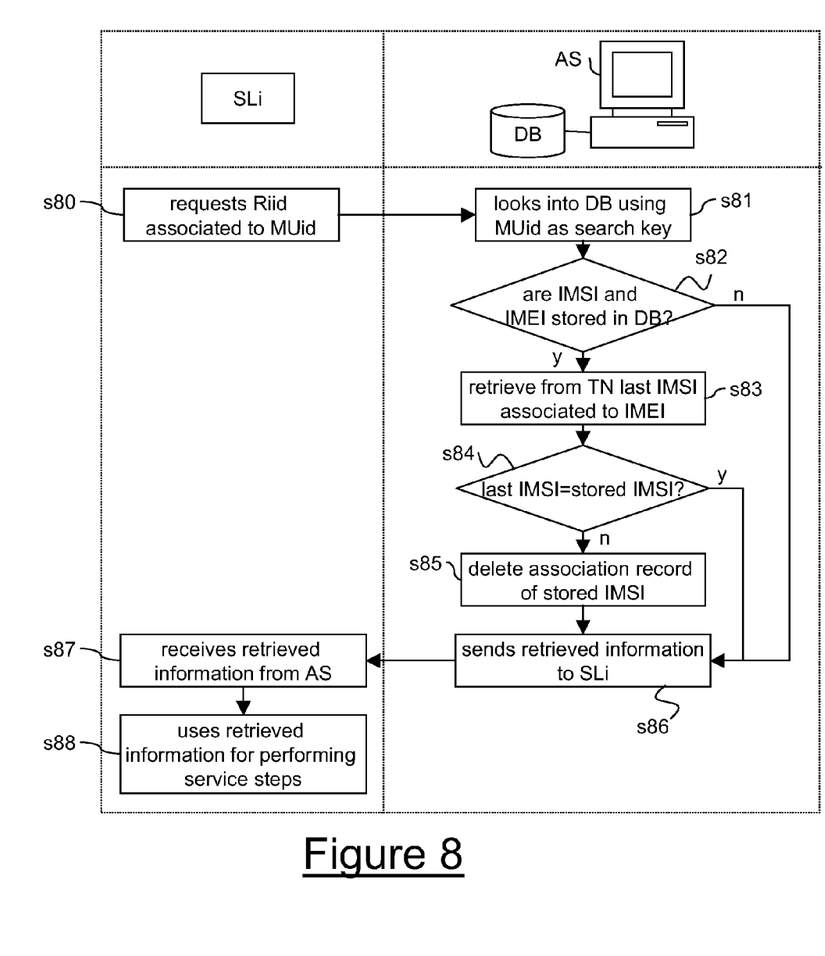
FIG. 8 partially shows the operation of the telecommunication system of FIG. 7.

FIG. 8 schematically shows the steps allowing a service logic component SLi (which may be indifferently SL3, SL3', SL4 or SL4') to access the association between the mobile user identifier MUid and the radio identifier RIid. Similarly to FIG. 2, FIG. 8 is in the form of a flow chart. On the top of the flow chart, the various devices (service logic component SLi and association server AS) performing the steps are shown for improving clarity.

When the user activates the additional mobile service, the service logic component SLi receives the mobile user identifier MUid of the user, and it realizes that it has to retrieve the radio identifier RIid associated to the mobile user identifier MUid. Therefore, during a first step s80, the service logic component SLi requests to the association server AS the radio identifier RIid associated to the mobile user identifier MUid.

Upon reception of the request, the association server AS accesses the database DB and it looks up the association records stored therein by using as a search key the mobile user identifier MUid provided by the logic service component SLi (step s81). When the association server AS finds the searched association record AR, it retrieves from the association record the radio identifier RIid and it preferably also checks whether the IMSI code and the IMEI code are available in the association record (step s82). In the negative, the association server AS performs a step s86 of sending the retrieved information (i.e. the radio identifier RIid) to the service logic component SLi. On the contrary, if the IMSI code and the IMEI code are available in the association record, the association server AS preferably retrieves from the telephone network TN the last IMSI code used by the mobile phone identified by the IMEI code (step s83). Then, the association server AS compares the IMSI code retrieved from the telephone network TN during step s83 and the IMSI code stored in the association record (step s84). If the two IMSI codes are equal, then the association server AS performs the step s86 of sending the retrieved information (i.e. the radio identifier RIid) to the service logic component SLi. Otherwise, if the two IMSI codes are different, the association server AS deletes the association record, since it comprises "old" information (step s85).

Finally, the service logic component SLi receives the retrieved information (step s87) and it uses them for performing the various service tasks (step s88).

The invention claimed is:

1. A method of associating a mobile user identifier identifying a mobile interface of a mobile phone and a radio identifier identifying a radio interface of said mobile phone, said mobile interface being based on a mobile technology and said radio interface being based on a radio technology different from said mobile technology, comprising:
  a) detecting, by a device configured to communicate with said radio interface, that said mobile phone is located within a coverage area of said device, thus recovering said radio identifier;
  b) establishing a radio connection based on said radio technology between said device and said mobile phone;
  c) transmitting to said mobile phone through said radio connection a command to access a mobile service for transmitting to an association server a message comprising said radio identifier;
  d) storing at said device a transmission time when said command has been transmitted to said mobile phone and information indicative of an outcome of said transmitting;
  e) upon reception of said command, automatically transmitting, by said mobile phone, said message to said association server through said mobile service;
  f) retrieving, by said association server, said mobile user identifier through said mobile service and reading said radio identifier from said message, thereby associating said mobile user identifier and said radio identifier; and
  g) estimating, based on the transmission time, a successive time when a refresh of the association is to be performed.

2. The method according to claim 1, wherein step a) is periodically repeated every T1 seconds.

3. The method according to claim 1, wherein step a) comprises performing a Bluetooth device discovery and step b) comprises establishing a Bluetooth connection between said device and said mobile phone.

4. The method according to claim 1, wherein steps b) through e) are periodically performed every T2 seconds.

5. The method according to claim 1, wherein step c) comprises transmitting to said mobile phone through said radio connection a command to access a short message service.

6. The method according to claim 1, wherein step c) comprises transmitting to said mobile phone through said radio connection a command to access a general packet radio service.

7. The method according to claim 1, wherein step e) further comprises receiving, at said association server, a counter, transmitted from said mobile phone, wherein the counter is increased by one at said device each time said command is transmitted to said mobile phone.

8. The method according to claim 1, wherein step e) further comprises receiving a message encrypted by using a password.

9. The method according to claim 1, wherein step e) further comprises receiving from said mobile phone a security key allowing authentication of said message.

10. The method according to claim 1, wherein steps b) through e) are repeated after the estimated successive time has elapsed.

11. The method according to claim 9, wherein step f) further comprises, before said reading, authenticating said message.

12. The method according to claim 1, wherein step f) further comprises, after said retrieving and said reading, storing an association between said mobile user identifier and said radio identifier in an association record of an association table.

13. A telecommunication system configured to associate a mobile user identifier identifying a mobile interface of a mobile phone and a radio identifier identifying a radio interface of said mobile phone, comprising:
  a mobile phone provided with said mobile interface and said radio interface, said mobile interface that is based on a mobile technology and said radio interface that is based on a radio technology different from said mobile technology;
  a device having a further radio interface that is based on said radio technology; and
  an association server,
  wherein:
    i) said device is configured to:
      detect that said mobile phone is located within a coverage area of said device, thus recovering said radio identifier;
      establish a radio connection based on said radio technology with said mobile phone;
      transmit to said mobile phone through said radio connection a command to access a mobile service for transmitting to an association server a message comprising said radio identifier; and
      store a transmission time when said command has been transmitted to said mobile phone, and information indicative of an outcome of said transmitting;
    ii) said mobile phone is configured to:
      upon reception of said command, automatically transmit said message to said association server through said mobile service; and
    iii) said association server is configured to:
      retrieve said mobile user identifier through said mobile service and read said radio identifier from said message, thereby associating said mobile user identifier and said radio identifier, and
  wherein said device is configured to estimate, based on the transmission, a successive time when a refresh of the association is to be performed.

14. The telecommunication system according to claim 13, wherein said device is configured to periodically repeat said detect every T1 seconds.

15. The telecommunication system according to claim 13, wherein said device is configured to periodically repeat said establish and said transmit every T2 seconds.

16. The telecommunication system according to claim 13, wherein said device is further configured to increment a counter which is transmitted in said message each time said command is transmitted to said mobile phone.

17. The telecommunication system according to claim 13, wherein said radio interface and said further radio interface are Bluetooth interfaces.

18. The telecommunication system according to claim 13, wherein said mobile phone is configured to transmit said message to said association server through a short message service.

19. The telecommunication system according to claim 13, wherein said mobile phone is configured to transmit said message to said association server through a general packet radio service.

20. The telecommunication system according to claim 13, wherein said mobile phone is further configured to encrypt said message by using a password.

21. The telecommunication system according to claim 13, wherein said mobile phone is further configured to transmit to said association server a security key allowing authentication of said message.

22. The telecommunication system according to claim 21, wherein said association server is configured to, before said retrieve, authenticate said message.

23. The telecommunication system according to claim 13, further comprising a database cooperating with said association server for storing an association between said mobile user identifier and said radio identifier.

24. The telecommunication system according to claim 23, wherein said database is configured to store further information relating to a user of said mobile phone and to said mobile phone.

* * * * *